United States Patent
Pickren

(10) Patent No.: US 6,582,025 B2
(45) Date of Patent: Jun. 24, 2003

(54) SULFUR STORAGE METHOD

(75) Inventor: Roy Anthony Pickren, New Orleans, LA (US)

(73) Assignee: Crescent Technology, Inc., New Orleans, LA (US)

( * ) Notice: Subject to any disclaimer, the term of this patent is extended or adjusted under 35 U.S.C. 154(b) by 12 days.

(21) Appl. No.: 09/920,657

(22) Filed: Aug. 3, 2001

(65) Prior Publication Data

US 2003/0025381 A1 Feb. 6, 2003

(51) Int. Cl.$^7$ ................................................ E21F 17/16
(52) U.S. Cl. ............................................ 299/6; 405/53
(58) Field of Search ........................... 405/53, 55, 59; 299/2, 3, 6; 422/40

(56) References Cited

U.S. PATENT DOCUMENTS

| | | | |
|---|---|---|---|
| 2,792,708 A | * 5/1957 | Johnston, Jr. et al. | 73/149 |
| 3,277,654 A | * 10/1966 | Shiver | 405/55 |
| 4,149,837 A | 4/1979 | Baker et al. | |
| 4,151,234 A | 4/1979 | Schofield | |
| 4,171,200 A | 10/1979 | Jagodzinski et al. | |
| 4,190,627 A | 2/1980 | Leszczynska et al. | |
| 4,474,053 A | * 10/1984 | Butler | 73/40 |
| 4,577,999 A | * 3/1986 | Lindorfer et al. | 588/250 |
| 4,595,350 A | 6/1986 | Harbolt et al. | |
| 4,624,130 A | * 11/1986 | Faul et al. | 73/40.7 |
| 4,626,131 A | * 12/1986 | Glew et al. | 405/59 |
| 4,692,061 A | * 9/1987 | Lindorfer et al. | 588/250 |
| 4,705,432 A | 11/1987 | Harbolt et al. | |
| 4,906,135 A | * 3/1990 | Brassow et al. | 405/129.35 |
| 5,041,275 A | 8/1991 | Miller | |
| 5,147,147 A | * 9/1992 | Peterson et al. | 405/59 |
| 5,340,383 A | 8/1994 | Womack | |

* cited by examiner

Primary Examiner—Thomas B. Will
Assistant Examiner—Daniel P Stephenson
(74) Attorney, Agent, or Firm—Raúl V. Fonte

(57) ABSTRACT

A method and a system are provided for the storage and long-term conservation of commercially produced sulfur. An underground cavity is identified and selected from an earth formation such that its permeability and porosity allow sulfur to be retained within the cavity. An impervious borehole that penetrates the cavity from the surface of the earth through the formation is provided, and the sulfur is then injected through the borehole. Solution-mined, salt-enclosed cavities, located at less than about 3,000 feet of depth are preferred. The stored sulfur is withdrawn, when desired, by injecting pressurized hot water, at 280°–320° F., through a first annular space, created within the same borehole, and pressurized air through a second annular space so as to cause the sulfur within the cavity to melt and rise to the surface of the earth through a centric space within the borehole.

21 Claims, 3 Drawing Sheets

SULFUR STORAGE METHOD

FIELD OF THE INVENTION

This invention relates to a method and system for the storage of sulfur and, more particularly, to a method and system for storing sulfur for prolonged periods of time. Specifically, the invention is concerned with novel techniques for the storage of commercially produced sulfur in subterranean cavities.

BACKGROUND OF THE INVENTION

Sulfur is the key raw material in the manufacture of sulfuric acid, the largest commodity chemical in the world in terms of tonnage, and is also used in many other industrial, analytical and medical applications throughout the world. Historically, mined natural sulfur has been the primary source of commercially produced sulfur, although this position has given way in recent years to sulfur recovered from crude oil and natural gas processing. Natural sulfur is mined primarily from underground formations by the Frasch hot water injection process, while considerable lesser amounts are obtained from volcanic rock and other types of ores by traditional mining techniques. Recovered sulfur is obtained largely as a byproduct of crude oil and natural gas production operations by the treatment of gaseous hydrogen sulfide streams in Claus Process plants and the like. Regardless of its source, all mined and recovered sulfur must be properly stored prior to its commercial use.

Conventional sulfur storage methods and facilities often involve the use of steam-heated tanks, where molten sulfur is kept at temperatures usually exceeding 260° F., or they may involve the accumulation of solid sulfur storage blocks, also known as "vats", in contained open areas from which pieces of sulfur may be broken off by mechanical means, crushed and shipped in solid form, or remelted and transported in liquid form.

Molten sulfur storage tanks are expensive to fabricate, operate and maintain. Although often suitable for short-term storage, e.g., less than three months or so, their use is not always economically feasible. The capital cost involved in their fabrication, the expenses associated with correcting corrosion problems, and the cost of the energy required to provide a constant source of steam for keeping the stored sulfur in liquid state do not always make molten sulfur storage tanks best suited for the long-term safekeeping of commercially produced sulfur inventories.

Commercially produced sulfur storage vats (sometimes also referred to as "blocks") are formed by pouring molten run-of-mine or recovered sulfur in contained open areas where the sulfur is allowed to cool and solidify by exposure to ambient conditions. Vats tend to pick up water from rain and atmospheric moisture and form sulfuric acid which, through seepage under the solidified blocks of sulfur and through water runoff, becomes a source of soil and water contamination. In addition, when the sulfur is broken off from the vats to be transported, particulate sulfur is often given off which becomes a source of air contamination. To avoid or minimize releases of particulate sulfur, the sulfur scheduled for transportation is often melted in situ prior to shipping it to the desired locations, and this step adds more capital, operating and maintenance costs to the storage system. Vats also tend to retain sporadic pockets of hot molten sulfur which are not always easy to detect, and which therefore constitute an industrial safety hazard. In some locations, the handling, transportation and/or storage of solid sulfur is prohibited, or so encumbered by regulatory controls as to make them commercially unattractive. Conventional sulfur storage techniques and equipment are described in U.S. Pat. Nos. 4,149,837, 4,151,234, 4,171,200, 4,190,627, 4,595,350, 4,705,432, 5,041,275 and 5,340,383.

In recent years, the inventories of recovered sulfur have increased dramatically worldwide, partly because of the implementation of stricter environmental regulations in practically every country in the world. Industrial plant gases and other sources of sulfur from crude oil and natural gas production operations must be treated to remove their sulfur constituents before releasing them to the atmosphere or otherwise disposing of them. The result is that large inventories of byproduct recovered sulfur continue to be generated which often exceed the current demand for sulfur as a commodity chemical. These inventories must be properly stored, sometimes for long periods of time, i.e., for five or ten years, or even longer, until the market demand calls for their use.

From the foregoing, it is apparent that an important need exists for commercially produced sulfur storage means that are not only capable of safekeeping large industrial tonnages of sulfur for long periods of time, but are also cost effective and environmentally sound. The present invention is directed toward providing such means.

It is an object of the present invention to provide a method and a system for the proper and safe storage of both solid and liquid sulfur. Another object of this invention is to provide a commercially practicable technique for the long-term storage of sulfur at relatively low maintenance and operating costs. A specific object of the invention is to provide a commercially practicable method for the storage of "recovered sulfur", that is, sulfur that has been recovered, or produced, as a byproduct of crude oil and natural gas production operations. A further object of the present invention is to provide an environmentally attractive method for storing commercially produced sulfur, which minimizes the release of sulfur compounds to the atmosphere during storage. Another object of this invention is to provide a system for the storage of commercially produced sulfur at a location close to where the sulfur is mined or recovered, thereby minimizing the costs associated with the transportation and the handling of the sulfur in special sulfur storage tanks or vats. Another object of the invention is to provide an environmentally sound system for the long-term storage of commercially produced sulfur from which the sulfur may be easily and inexpensively reclaimed, when needed, by means of pressurized hot water techniques. A further object of the present invention is to provide an improved method and system for the conservation of an important natural resource, i.e., sulfur, which method and system will help prevent, or at least minimize, future shortages of this important natural resource as its sources become gradually depleted. These and other objects of the invention will be apparent to those skilled in the art from the description that follows.

SUMMARY OF THE INVENTION

The method and system of this invention center around the innovative concept of injecting commercially produced sulfur in a mined subterranean cavity. Commercial sulfur, in elemental state, is produced by mining, or as a byproduct of industrial operations such as crude oil and natural gas production operations. Commercially produced sulfur is often found in molten state as well as in solid state. At ambient pressures and temperatures, elemental sulfur is solid. At ambient pressures and elevated temperatures, that is, at atmospheric pressures and at temperatures higher than about 240° F., elemental sulfur is liquid. The method of this invention is particularly suited for the long-term storage of recovered sulfur, which is often produced in liquid form. However, the method may also be used to store mined sulfur, produced in solid form or in molten state, and recovered sulfur produced in solid form. According to the method of this invention, a mined subterranean cavity is first located or created within a naturally occurring earth formation, and a borehole is provided on the surface of the earth and through the earth formation, which penetrates the subterranean cavity near its top, or at some other convenient location on the cavity. The sulfur to be stored is then injected through the borehole by means of pumping equipment adapted to handle the flow of sulfur, or simply by allowing the sulfur to flow by gravity into the subterranean cavity. The injection of sulfur in this manner is continued until a significant portion of the cavity is filled with sulfur. The sulfur is then stored within the cavity by causing it to settle into the lower portion of the cavity. The stored sulfur is maintained in place by the walls of the cavity. The sulfur can be stored for long periods of time in this fashion and then made available for commercial uses, when needed, by withdrawing as much as necessary by means of hot water injection techniques. The sulfur storage method of this invention thus avoids the need to provide above ground installations for such storage operations and affords the opportunity to efficiently conserve this valuable natural resource for prolonged periods of time under conditions that have minimum or no impact on the environment.

The mined subterranean cavity prescribed by the method and system of this invention is a cavity formed by the mechanical mining or by the solution mining of underground mineral deposits such as those found in salt beds and salt domes. The mined subterranean cavity should not contain any fractures, and should be located in formations that exhibit low permeability and low porosity, and little or no movement of oxygen-containing groundwater so as to avoid loss of sulfur from the cavity and contamination of the surrounding areas by sulfur acids which otherwise would be produced from oxidation of the sulfur. The cavity is preferably a solution-mined subterranean cavity created by the solution mining of salt in a naturally occurring salt dome. Such cavities are particularly suitable for use in the storage system and method of this invention because they tend to be impermeable. The exact depth of the cavity, i.e., the distance from the bottom of the cavity to the surface of the earth, is not critical, but, as explained below, less energy is required to reclaim the sulfur and return it to the surface of the earth if the cavity is near the surface. For example, when reclaiming the sulfur through a borehole by melting with pressurized hot water and air-lifting the molten sulfur to the surface, less heat is lost through the borehole and less air pressure is needed to lift the sulfur if the storage cavity is near the surface. Cavities located at depths of less than about 3,000 feet below the surface of the earth are preferred for this reason.

When storing commercially produced liquid sulfur using the system and method of this invention, the sulfur is injected into the borehole through a set of concentric pipes, disposed within the borehole, through which a heating fluid is also circulated at a rate sufficient to prevent the sulfur from freezing within the borehole. The preferred heating fluid is water that has been pressurized and heated so that its boiling point sufficiently exceeds the melting point of the sulfur so as to keep the sulfur in liquid state and prevent it from freezing within the borehole. Specifically, the temperature of the sulfur while in transit through the borehole is kept above about 250° F., and preferably between about 270° and 300° F. Any fluids present in the cavity prior to the injection in this manner are displaced by the incoming sulfur, which is then deposited within the lower part of the cavity and retained therein in solid or liquid form as explained below. This process is continued until the cavity is substantially filled or a prescribed desired volume level is reached. When the molten sulfur is injected into and through an aqueous fluid that is present in the cavity at a temperature substantially below the melting point of sulfur, sulfur droplets freeze and settle, and are retained as solid particles. When the molten sulfur is injected through an aqueous fluid present in the cavity from an injection point terminating near the bottom of the cavity, the bed of particles accumulating on the bottom of the cavity eventually reaches the discharge end of the injection pipe and forms a pool of molten sulfur. The pool is maintained in the molten state, if desired, by injection of pressurized hot water or hot brine at a temperature above the melting point of sulfur.

Since heat losses to an overlying gas are lower than heat losses to an overlying aqueous fluid, a gas-filled cavity is preferred for the storage of molten sulfur when desiring to form and temporarily maintain a pool of molten sulfur. Thus, for example, in the case of a solution mined cavity, the brine or any other aqueous solution remaining after the formation of the cavity is displaced by a gas, such as nitrogen, carbon dioxide or methane, to form a substantially gas-filled cavity, which is then used for the storage of sulfur in accordance with the method of this invention.

Formation and maintenance of a pool of molten sulfur within the storage cavity, whether overlain by a gas or any another fluid, allow the immediate reclamation of a portion of the sulfur, and are useful under conditions that require frequent reclamation of some of the stored sulfur in order to balance short-term demands for sale or for use. For long-term storage, i.e., five to ten years, and longer, the pool is allowed to freeze by discontinuing heat input. The frozen sulfur then remains in place indefinitely within the storage cavity.

Alternatively, the liquid sulfur to be stored may be subjected to granulation, as a preliminary step, to generate solid sulfur prills, which are then fed into the borehole, dry or in slurry form, and injected into the subterranean cavity as stipulated above. Injection of sulfur in this manner is conducted at the normal ambient temperatures existing within the borehole and without the need to provide means for imparting additional heat to the sulfur in order to keep it in molten state as it flows through the borehole. The sulfur prills injected in this fashion displace any fluids that may be present inside the cavity. The prills are deposited therein and remain in place within the cavity indefinitely.

When storing solid sulfur by the system and method of this invention, the sulfur can be melted and then treated as described above. Otherwise, the sulfur is crushed, or ground, and mixed with water, brine or some other suitable aqueous fluid to generate an aqueous slurry of sulfur which is then injected into the borehole and deposited within the subterranean cavity. Any fluids present in the cavity prior to the injection in this fashion are displaced upwards by the incoming sulfur, which is then deposited within the lower part of the cavity and retained therein. This process is continued until the cavity if substantially filled or a prescribed desired volume level is reached. By contrast with known systems for underground storage of natural gas, petroleum oil, refined petroleum products and other such petrochemicals, which are less dense than brine and hence tend to float on it, the system of this invention utilizes sulfur, which is much denser than brine, to displace the brine upwards while sinking to the bottom of the cavity.

Sulfur inventories injected into mined subterranean cavities by the method and system of this invention are conveniently retrieved, as the need arises, by means of hot water injection techniques whereby the stored sulfur is first melted with an injection of hot water under pressure. The molten sulfur is then lifted to the surface of the earth with the aid of pressurized air, which lowers the density of the molten sulfur. Alternatively, the molten sulfur may be pumped to the surface, e.g., with a submersible pump.

The present invention advances the art of sulfur storage and, in particular, provides an improved method and system for the long-term safe storage of commercially produced liquid sulfur, as well as commercially produced solid sulfur, with minimal operating and maintenance costs, minimal inventory losses and practically no environmental impact. The invention also provides an improved natural resource conservation method and system: as sources of high-sulfur-containing hydrocarbons become gradually depleted, future shortages of sulfur will be prevented, or minimized, by the judicious storage of this natural resource using the method and the system of this invention.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION OF THE INVENTION

Figure 1:
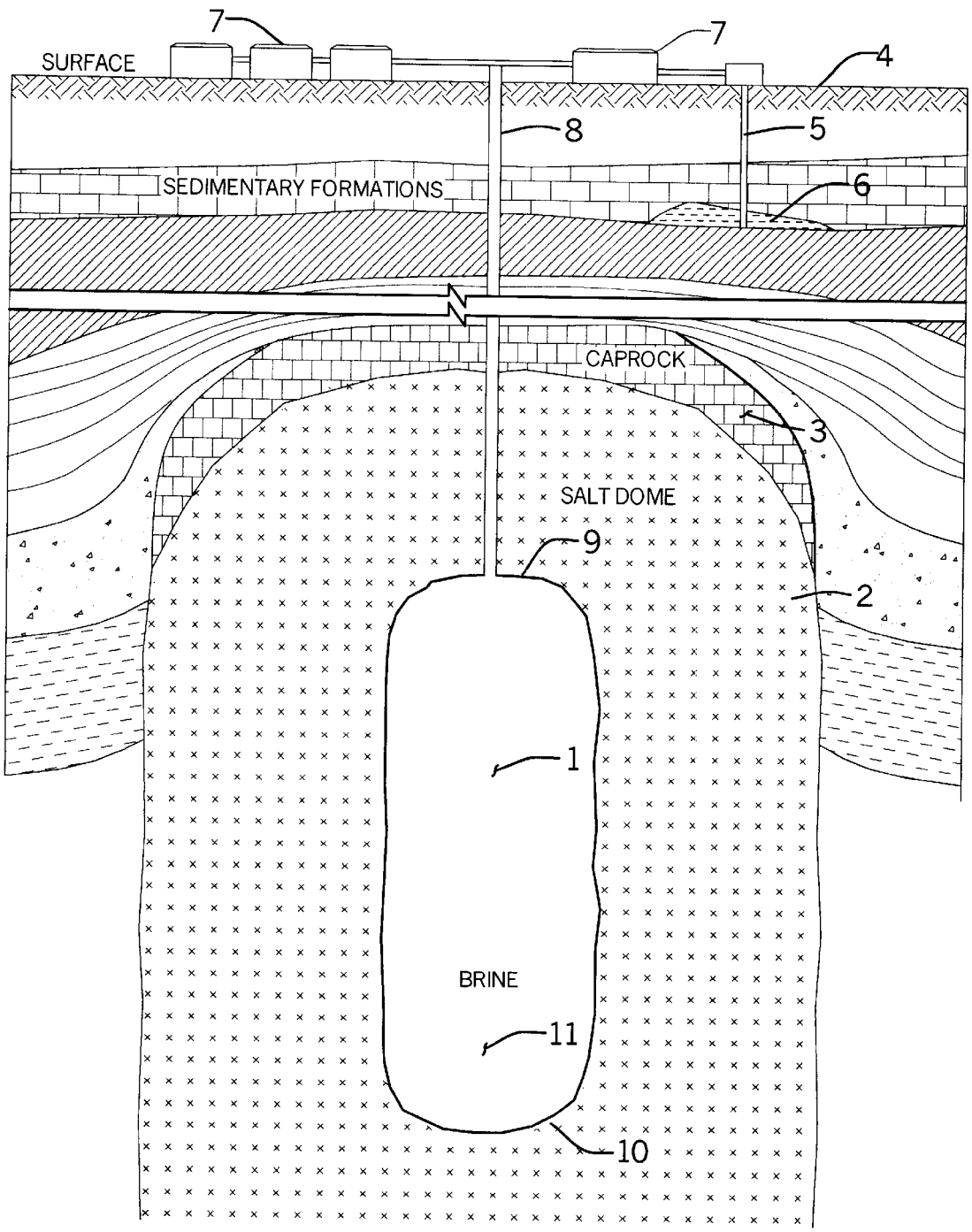
FIG. 1 illustrates a cross sectional view through several strata of the earth showing a brine-containing subterranean cavity prior to injection of the sulfur to be stored by the method and system of the invention. The cavity is located inside a salt dome and has been penetrated by a lined borehole of the type stipulated by the method and system of the invention. Also shown are above-ground facilities for receiving commercially produced sulfur and storing it underground for prolonged periods of time in accordance with the invention.

The sulfur stored by the technique of this invention is commercially produced sulfur, that is, elemental sulfur that has been produced either by mining or as a byproduct of industrial operations, such as crude oil and natural gas production operations and the like. Commercially produced sulfur normally has an elemental sulfur content of 99%, or higher, with small amounts of impurities such as carbon, hydrocarbons, hydrogen sulfide, inorganic salts and certain other solids making up the remainder of its composition. Commercially produced sulfur exists in molten state as well as in solid state. At ambient pressures and temperatures, elemental sulfur is solid. At ambient pressures and elevated temperatures, that is, at atmospheric pressures and at temperatures higher than about 240° F., elemental sulfur is liquid. The method of this invention is particularly suited for the long-term storage of byproduct, or recovered, sulfur, which is often produced in liquid form as part of the "sweetening" of hydrocarbons mined by the oil and gas industry and by the cleaning of gases and other process streams generated by the refining industry. The processes that generate byproduct, or recovered, sulfur usually involve the controlled oxidation of the hydrogen sulfide recovered from these streams so as to form elemental sulfur and water in a Claus Process plant or similar unit operation. Recovered sulfur usually has an elemental sulfur content of 99%, or higher, and small amounts of residual hydrogen sulfide and other impurities such as inorganic salts and other solids. The method of this invention may also be used to store mined sulfur, produced in solid form or in molten state, as well as recovered sulfur produced in solid form. Regardless of their physical state or method of production, inventories of commercially produced sulfur can be properly stored by the method of this invention for long periods of time, i.e., for five or ten years, or even longer, until the market demand calls for their use.

Naturally occurring formations suitable for the method and system of this invention are situated below the surface of the earth at many locations. Deposits of halite (sodium chloride), potash (potassium chloride), trona (sodium carbonate/bicarbonate), nahcolite (sodium bicarbonate) and other water-soluble salts are found in naturally occurring bedded evaporites and in salt domes in many locations in the United States. Substantial absence of groundwater movement within the formations in which they occur is a necessary condition for the existence of such water-soluble mineral deposits. In many or most cases, such deposits are stratigraphicly bound, that is, surrounded and protected by substantially impermeable strata from migrating groundwater that would have otherwise dissolved and removed them. The absence of groundwater movement within bedded evaporites and salt domes satisfies the key criterion needed for the environmentally safe underground storage of sulfur. Salt domes are a particularly desirable formation and are ideally suited for the underground storage of sulfur. The salt deposits within salt domes are highly consolidated with very little porosity or permeability and they are often several thousand feet deep. The very low permeability of the salt further secures the stored material from leakage and from the ingress of water.

In terms of height, i.e., floor-to-ceiling distance, subterranean cavities may be more than 1,000 feet tall. In terms of width, i.e., average distance between walls, these cavities may be anywhere between 100 and 1,000 feet wide. Vertically elongated cavities, i.e., cavities with height-to-width ratios greater than 1.0, can be created in salt domes by removing part of the salt from the domes using solution mining techniques. Vertically elongated cavities are conveniently filled with sulfur by allowing the injected sulfur to settle downward by gravity. Vertically elongated cavities are also preferred over horizontally elongated cavities because, when reclaiming the stored sulfur by hot water injection methods, the sulfur is melted faster and more efficiently than when the sulfur is stored in horizontally elongated cavities. The reason for this is that, when using hot water injection techniques to melt the sulfur or maintain it in molten state, the low density of hot water causes a greater tendency for the water to rise than to move laterally inside the cavities, thus better phase contact and heat transfer efficiencies are achieved in vertically elongated cavities.

The exact depth of the subterranean cavities prescribed by the method and system of this invention (i.e., the distance between the bottom of the cavity and the surface of the earth) is not critical, but the cost of forming and equipping the borehole, the cost of forming the cavities and the energy requirements for reclaiming the stored sulfur increase as the depth from the surface increases. Cavities located at depths of less than about 3,000 feet below the surface of the earth are preferred because they are generally easier and less costly to form and access, lose less heat through the borehole when injecting or reclaiming sulfur in the liquid state, and require less energy (less pressure in the case of an air lift) to return the reclaimed sulfur to the surface than cavities located at greater depths.

The cavity ceiling distance (i.e., the distance from the top of the cavity to the surface of the earth) should be at least about 200 feet, and preferably about 500 feet or more. The ability of a cavity to withstand internal pressures increases with the ceiling distance of the cavity. A ceiling distance of about 200 feet minimizes the risk of a blowout when reclaiming the stored sulfur by means of hot water injection techniques. If the cavity ceiling distance is substantially less than 200 feet, the vapor pressure of the hot water injected to melt the sulfur in order to withdraw it from storage may exceed the static pressure of the overburden column above the ceiling of the cavity and cause a blowout.

The cavity depth (i.e., the distance between the bottom of the cavity and the surface of the earth) can be as much as about 6,000 feet, and is preferably about 3,000 feet or less. The cavity should not contain any fractures and should be located in formations that exhibit low permeability and low porosity, as well as very low (i.e., essentially none) transmission of oxygen-containing groundwater, so as to avoid contamination of surrounding areas and loss of sulfur. When reclaiming the stored sulfur by means of hot water injection techniques, the water temperature must exceed the melting point of sulfur (about 240° F.). For that reason, the cavity should also be capable of withstanding internal pressures of at least 50 psia (pounds per square inch absolute), and preferably at least about 100 psia.

The subterranean cavity prescribed by the method and system of the invention is a mined subterranean cavity, that is, a cavity formed as a result of mechanical mining or solution mining of underground mineral deposits, such as deposits of sodium chloride (sometimes also referred to as "salt"), potassium chloride (sometimes also referred to as "potassium chloride salt", or simply "potash"), sodium carbonate minerals (such as "trona") and the like. Examples of suitable underground cavities include those salt-enclosed cavities resulting from the solution-mining removal of brine from sodium chloride-containing rock salt deposits for the purpose of recovering sodium chloride, and the cavities which result from the mechanical-mining removal of potassium chloride-containing potash deposits for the purpose of recovering potassium chloride. If desired, a mined subterranean cavity may also be created specifically for the method and system of this invention by means of conventional mechanical or solution mining techniques.

The preferred subterranean cavity is a solution-mined cavity whose bottom is located at between about 500 and 3,000 feet below the surface of the earth, and which has been created in a naturally occurring salt dome as a result of solution mining of salt with fresh or raw seawater in order to extract a brine that can be used for commercial purposes such as manufacture of chlorine and sodium hydroxide. (The normal salt content of seawater is about 3% sodium chloride. Brines are normally about 6 to 18% sodium chloride, if unsaturated, and as high as about 26% sodium chloride, if saturated). Such cavities are created, for example, in the process of mining sodium chloride salt, which is consumed in large amounts by the chloralkali industry and used in oil and gas well drilling fluids. These cavities are particularly suitable for use in the storage system and method of this invention because they tend to be impermeable and contain the stored sulfur quite satisfactorily, whether the sulfur is stored within the cavities in molten state, as a slurry of prills, as a slurry of ground solid sulfur, or in some other fashion.

Impermeable salt-enclosed cavities are found in salt beds (also known as "bedded evaporites") and in salt domes. These formations are usually found under the overburden and caprock formations in nature. Subsurface salt formations containing bedded evaporites and salt domes exist in Louisiana, Texas, Ohio, New York, Michigan, Kansas, New Mexico and Florida, as well as in other states, and in Canada and other parts of the world. In the U.S., bedded evaporites tend to be found in inland areas, whereas salt domes seem to favor the areas around the Gulf of Mexico coast. Detailed seismic information is available in many technical journals and from both private and government organizations for determining the exact location, dimensions and shapes of existing salt cavities and potential sites for future cavities. Since transportation costs are an important commercial consideration, the best cavities should be located near the source of the produced sulfur.

Rock salt from most salt domes is always at least 90% sodium chloride; salt from Louisiana domes is almost 100% sodium chloride. The salt from different domes can exhibit different properties, which in turn affect the strength and deformation characteristics of the walls of the cavity. For solution-mined cavities, the size and the shape of the cavity are also influenced by the particular solution-mining method employed in mining the cavity and by the amounts of fresh water used to dissolve the salt and generate the brine. A typical situation would be an operation where one volume of cavity is created by the injection of about ten volumes of fresh water, which in turn generate ten volumes of brine. The resulting cavity is usually elongated vertically and exhibits a wide variety of shapes. Pear shape, obelisk shape and elliptical cavities are not unusual. Cavities are often more than 1,000 feet tall and anywhere from 100 to 1,000 feet wide. The presence of the rubble that is often found at the bottom of a solution-mined cavity as a result of the solution mining process does not result in contamination of the stored sulfur because such rubble is deposited in the bottom of the cavity prior to the storage of the sulfur, and the sulfur, being less dense, resides mainly on top of and above the such rubble.

If an existing borehole to a previously mined cavity of the type prescribed by the method of this invention is impervious enough, or is lined with an impervious liner, then the existing borehole may continue to be used to access the cavity. Otherwise, a borehole is drilled from the surface of the earth through and extending into the overburden, the caprock and whatever other formations may exist between the surface and the salt formation until the salt formation and the cavity within the salt formation are reached. Conventional seismic and well drilling techniques are used to ensure that the cavity is penetrated at the desired angle and location. Normally, the cavity is penetrated at a location on or near the top. The degree of penetration into the roof of the cavity is determined by conventional wellbore mining principles and by other technical considerations. If the sulfur is being delivered to the cavity in solid prilled form, for example, the degree of vertical penetration into the cavity might be less than if the sulfur is being delivered to the cavity in molten form, where it may be more convenient to spout the molten sulfur at the lowest practicable level within the cavity to allow part of the sulfur to remain liquid for a longer period of time. A steel liner is cemented or otherwise installed in the borehole from the earth surface to the roof of the cavity. The liner, or "casing", may also be made of nickel alloy, titanium, fiberglass reinforced plastic, or any other material impervious enough to prevent penetration of the walls of the borehole by sulfur, brines or any other fluids. More than one liner, or casing, may be used to ensure the integrity of the system.

When the commercially produced sulfur to be stored is in solid form, the sulfur may be first crushed or ground using conventional crushing and grinding equipment, then fed, dry, to the borehole opening on the surface of the earth and allowed to flow by gravity into the subterranean cavity. When storing sulfur that is commercially produced in solid form, however, it is best to crush it and mix it with water or brine, or to grind it with water or brine, to form an aqueous slurry of ground elemental sulfur, and inject the slurry into the cavity with or without the aid of pumping. Whenever sulfur is injected in the form of a slurry, the preparation of the slurry is best carried out at the surface of the earth prior to the injection. Brine is preferred over water if further solution mining of the salt inherently present on the walls of the cavity is to be avoided or minimized. If allowed to flow by gravity, the slurry density should be adjusted so that the pressure at the point of injection is greater than the pressure within the cavity. If pumped into a brine-containing, salt-enclosed cavity, the slurry should be fed into the cavity through the center opening of a set of concentric pipes that is installed within the borehole and through which the slurry can be made to flow down into the formation so as to displace the brine inside the cavity and cause it to come up the annular space within the set of concentric pipes. The injection of solid sulfur into the subterranean cavity in this manner may be conducted at ambient temperatures. Because sulfur particles tend to settle downward, the removal of the brine in these cases is best carried out from a location substantially removed from the sulfur slurry injection point, and preferably at an elevation higher than the sulfur slurry injection point. In this manner, the entrainment of the sulfur particles by the displaced brine can be minimized or totally avoided. Removal of the brine is thus carried out, for example, with a single borehole by injecting the sulfur down a central tube and withdrawing the brine from a higher elevation through an annulus. Alternatively, separate boreholes can be drilled and used for sulfur injection and brine displacement, respectively. In either case, particle entrainment can be further minimized by the addition of a polyacrylamide, or some other suitable flocculant, to the slurry prior to its injection into the cavity. Flocculation in this fashion enhances the settlement of the fine sulfur particles and prevents or minimizes their entrainment by the displaced brine, thereby making the brine more suitable for recirculation within the system and/or discharge.

When the commercially produced sulfur to be stored is in liquid form, the liquid sulfur may be granulated by well-known "prilling" techniques in order to make solid sulfur prills, which are then fed into the borehole and injected as such, in dry form, or in aqueous slurry form. The injection of prilled sulfur in this manner may be conducted at ambient or near ambient temperatures. Prilling techniques, which are sometimes referred to as "pelletizing", often involve the quenching of molten sulfur droplets in water. In one such prilling operation, molten sulfur is contacted with an aqueous medium such as water or brine to flash freeze the molten sulfur into small nuggets or "prills". Prilling can also be effected without water by allowing a stream of liquid sulfur to suddenly become exposed to a stream of air at ambient temperatures, thus causing the formation of dry sulfur prills, or pellets. Because brine and sulfur can be corrosive to steel piping, chemically resistant pipes, such as alloy pipes and coated, or lined, steel pipes, are used when transporting a slurry of sulfur prills and brine. If a heat sensitive coating, or lining, is used, a cooling step is employed prior to transporting the slurry in order to avoid piping damage. As the slurry of sulfur prills and brine is conveyed to the subterranean cavity, the slurry is allowed to stand within the cavity until separation of the heavier sulfur phase from the lighter brine phase occurs. The thus stored sulfur prills are then retained therein indefinitely.

When storing sulfur that is commercially produced in liquid form, the sulfur may also be injected through the borehole in liquid state. Molten sulfur has a specific gravity of about 1.8, so the mass of molten sulfur flowing through the borehole by gravity will usually develop a pressure greater than the pressure within the cavity, but pumping may be employed, if needed, to overcome friction losses. Commercially produced molten sulfur is best injected into the borehole through a set of concentric pipes installed within the borehole and through which pressurized hot water or some other suitable heating fluid is circulated so as to prevent the molten sulfur from freezing. For example, pressurizing water to about 67 psia (pounds per square inch absolute) raises its corresponding boiling point to 300° F. Thus, sulfur flowing through an annular space within the borehole can be kept in molten state by continuously circulating pressurized hot water, at about 280–320° F., through the adjacent annular space within the borehole. A steam-heated shell-and-tube heat exchanger, or other suitable means of heating, is used to reheat the return water prior to recirculation. If pumped into a brine-containing, salt-enclosed cavity, the molten sulfur is fed into the cavity through the center pipe or one of several annular spaces of a set of concentric pipes which is installed within the borehole and through which the molten sulfur is made to flow down into the formation so as to displace the brine inside the cavity and cause it to come up a different annular space within the set of concentric pipes. Other annular spaces can be used to circulate the pressurized hot water so as to prevent the sulfur from freezing, as already discussed.

In a preferred embodiment, molten sulfur is stored in a brine-containing salt cavity located within an impermeable salt formation at a depth of about 2,000 feet below the surface of the earth. The borehole is lined with an impervious set of cemented casings passing through the formation above the cavity; and a set of concentric pipes forming at least two annuli is placed within the casings and into the cavity. The innermost pipe within the casings is used to transport the molten sulfur that is being injected into the cavity, which displaces the brine inside the cavity, while the first annulus, extending outwards from the center, is employed to transport the pressurized heating water that is used to maintain the sulfur in molten state. The injected pressurized heating water is kept at a temperature between about 280° and 320° F. The second annulus, extending outwards from the center, is used as the heating water return path to the surface. The set of pipes forming the first and second annuli extend deepest into the cavity. The third and outermost annulus is formed by placing the outermost pipe within the casings. This outermost pipe does not extend as deep into the cavity as the set of pipes forming the first and second annuli, but is installed at a location deep enough to allow the displaced brine to come up to the surface through the third annulus.

The stored sulfur is withdrawn from the mined subterranean cavity, when desired, by injecting pressurized hot water (at a temperature between about 280° and 320° F.) through a first annular space created within a set of concentric pipes disposed within the borehole and pressurized air through a second annular space, also created within the same set of concentric pipes, so as to cause the sulfur within the cavity to melt and rise to the surface of the earth through a centric production tube which is also provided within the same set of concentric pipes inside the borehole. Alternatively, the sulfur may be brought up to the surface through a separate borehole that penetrates the underground cavity at a different location and is equipped with a set of concentric pipes or similar means for delivering a heating fluid and air to the cavity and cause the sulfur to melt and rise to the surface in liquid state. If the cavity is relatively shallow, e.g., only 500–600 feet deep, then one or more submersible pumps may be used to bring up the stored sulfur once the sulfur is melted within the cavity.

Figure 2:
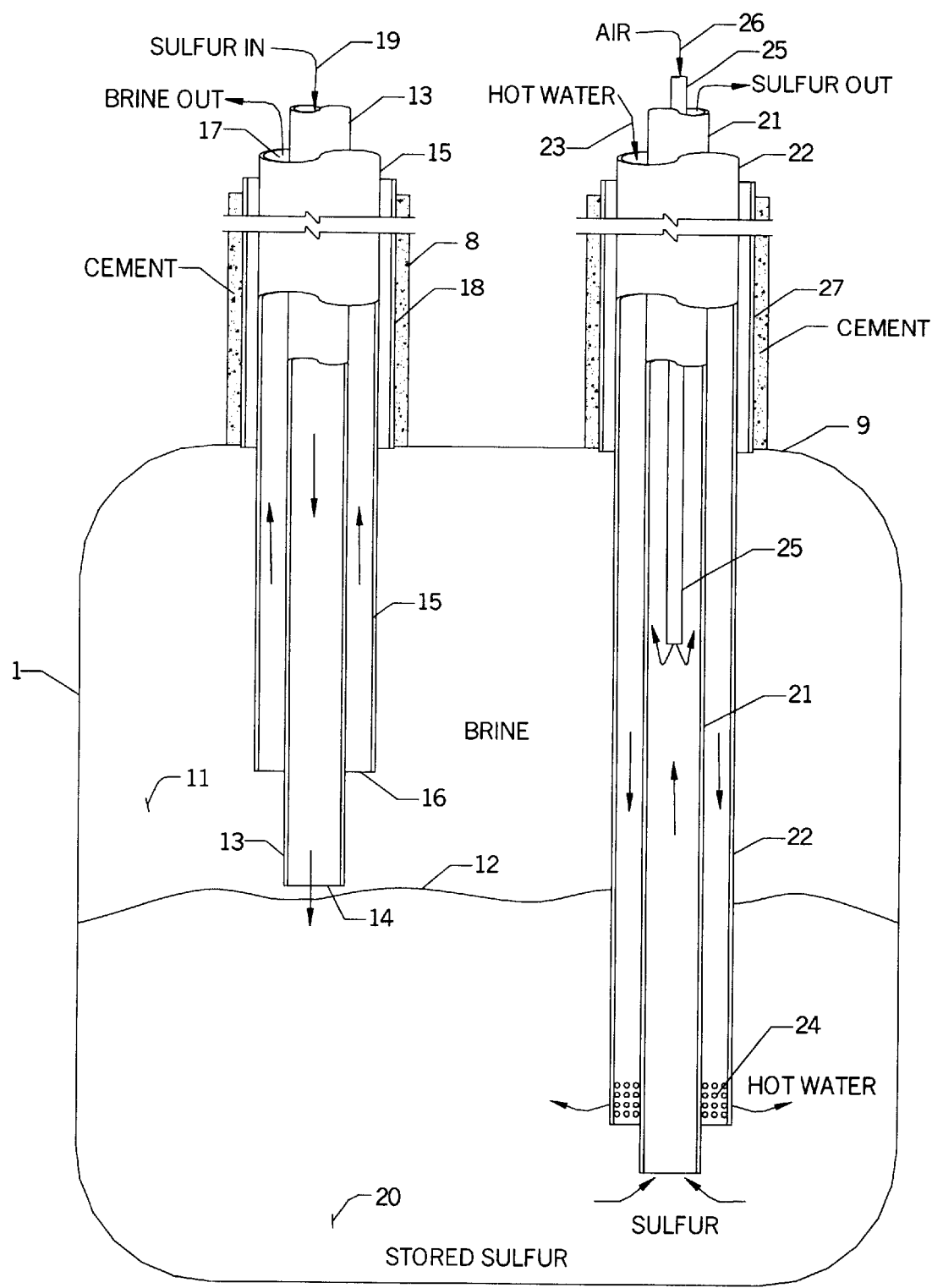
FIG. 2 is a schematic diagram of a preferred embodiment, where solid sulfur to be stored has been crushed or ground, then mixed with water or brine above the surface of the earth to form an aqueous slurry of elemental sulfur, and shows the slurry being injected into the underground cavity by means of the method and system of the invention. Also shown are the means for withdrawing the stored sulfur at a subsequent opportune time.
Figure 3:
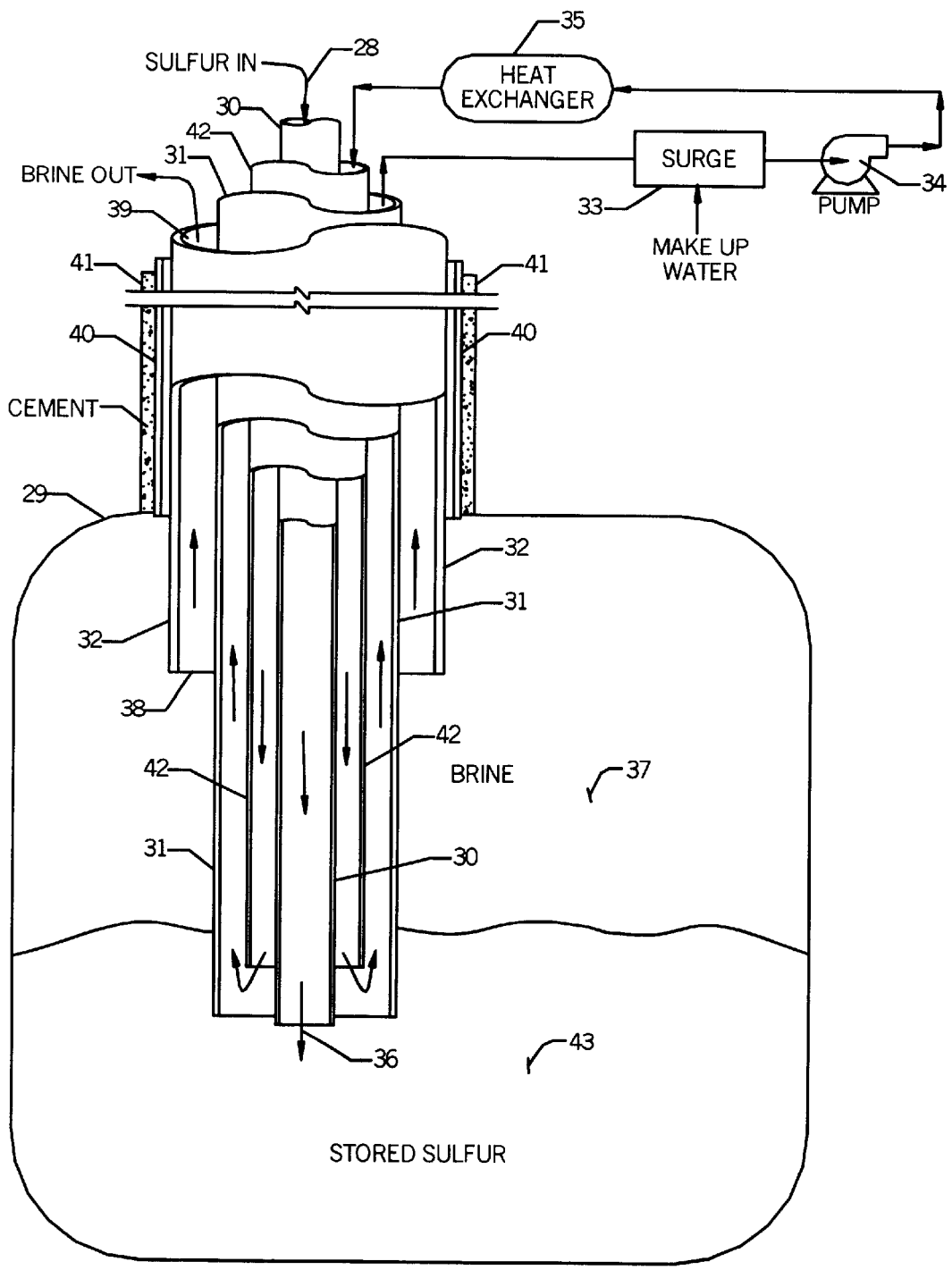
FIG. 3 is a schematic diagram depicting another preferred embodiment, where liquid sulfur to be stored is kept in molten state during injection into the underground cavity by a heating fluid flowing through a set of concentric pipes provided by the method and system of the invention.

Referring to FIG. 1, the cross sectional view illustrated therein shows preferred vertically elongated subterranean cavity 1 inside salt formation 2, below caprock 3, being penetrated by lined borehole 8 at or near cavity ceiling 9. Subterranean cavity 1 has been solution-mined and contains brine 11. The depth of subterranean cavity 1, i.e., the distance between its bottom 10 and ground surface 4, is between about 500 and 3,000 feet. The sulfur to be stored comes from support facilities 7, located above ground surface 4. Support facilities 7 are used to receive from various sources (and, if necessary, process), as described above, the sulfur to be stored. Support facilities 7 may include a sulfur reception area, crushing and grinding equipment, pelletizing equipment, slurry preparation facilities, steam-heated molten sulfur lines, holding tanks and the like. Disposal well 5 is used to inject brine exiting subterranean cavity 1 into brine disposal reservoir 6 by commonly known solution-mining techniques. FIG. 2 shows a preferred embodiment, where solid sulfur to be stored has been crushed or ground, then mixed with water or brine above the surface of the earth to form an aqueous elemental sulfur slurry 19, which is injected into underground cavity 1 by means of pumping equipment through concentric steel sulfur pipe 13. Concentric steel sulfur pipe 13 is concentrically mounted within concentric brine pipe 15. Sulfur slurry 19 exits sulfur pipe 13 through sulfur discharge 14, displacing the brine from the bottom of subterranean cavity 1 and eventually creating sulfur-brine interface 12 between sulfur 20 and brine 11. The ground sulfur is then retained in place within the cavity as stored sulfur 20. Displaced brine 11, being lighter than sulfur, moves up towards intake 16 of concentric brine pipe 15 and exits the system through brine discharge 17. The displaced brine is injected into a brine disposal well or otherwise properly disposed of. Cemented steel casing 18 surrounds concentric brine pipe 15 and acts as the substantially impervious liner of borehole 8, which prevents its collapse and the penetration of its walls by sulfur, brines or any other fluids. Additional concentrically disposed liners may be used to further improve the sealing of the borehole and ensure the integrity of the system. Also shown in FIG. 2 are the means for withdrawing the stored sulfur at a subsequent opportune time. These consist of a set of concentrically arranged pipes which also penetrate subterranean cavity 1 through the caprock and several other sedimentary formations, and through which pressurized hot water and air are made to flow down in order to uplift the stored sulfur all the way to the surface of the earth. Thus, steel sulfur pipe 21 is concentrically mounted inside concentric pressurized hot water pipe 22, through which hot water 23 at a temperature of about 320° F is pumped into the cavity. Hot water 23 exits pressurized hot water pipe 22 through bottom perforations 24, gives off heat to the stored sulfur, and flows up towards and mixes with brine 11. The hot water causes stored sulfur 20 to melt and remain molten within steel sulfur pipe 21 as the molten sulfur is then made to flow up by the pressure exerted by the weight of brine 11 and the uplifting effect caused by the density-lowering pressurized air 26, which is injected through airline 25, concentrically disposed within steel sulfur pipe 21. Cemented steel casing 27 surrounds hot water pipe 22, above the point of penetration near cavity ceiling 9, and provides stability to the system. The means for withdrawing the stored sulfur from the subterranean cavity may be placed, as shown in the illustration of FIG. 2, in an area within the cavity separate and apart from the area where the means for storing the sulfur are located. However, the means for withdrawing the stored sulfur may also be provided at the same location, that is, within the same borehole, where the means for storing the sulfur were installed, by first removing said storage means from the original borehole and assembling and placing the sulfur withdrawal means within the original borehole employing the same technique described above and making the necessary adjustments for size fitting the equipment, removing excess brine, etc. In the embodiment depicted in FIG. 3, liquid sulfur to be stored is kept in molten state during injection into the underground cavity. Thus, molten sulfur 28 is injected into subterranean cavity 29 by means of steel sulfur pipe 30, which is concentrically disposed within pressurized hot water pipe 31, which is in turn concentrically disposed within brine pipe 32. Pressurized hot water pipe 31 has another concentrically disposed pressurized hot water pipe 42 within it. Pressurized hot water pipe 42 surrounds steel sulfur pipe 30 and is open at the bottom to allow the hot water to circulate down pipe 42 and up pipe 31, exit the pipe assembly and be recirculated through surge tank 33, pump 34 and heat exchanger 35 before being fed back into the intake of pressurized hot water pipe 42. Hot molten sulfur 36, exiting sulfur pipe 30, displaces brine 37 from the bottom of subterranean cavity 29, is deposited at the bottom, and is retained in place within the cavity as stored sulfur 43. Displaced brine 37, being lighter than sulfur, moves up towards intake 38 of concentric brine pipe 32 and exits the system through brine discharge 39. The displaced brine is injected into a brine disposal well or otherwise properly disposed of. Cemented steel casing 40 surrounds concentric brine pipe 32 and acts as the substantially impervious liner of borehole 41, which prevents its collapse and provides stability to the system. Additional concentrically disposed casings may be used to best seal the borehole and provide additional stability. Stored sulfur 43 may be conveniently retrieved to the surface of the earth at a subsequent opportune time using the means for withdrawing the stored sulfur illustrated in FIG. 2, or by any other suitable means.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention, which is limited only by the scope of the following claims.

What is claimed is:

1. A method for storing elemental sulfur, comprising:
   (a) penetrating a subterranean cavity in a naturally occurring earth formation with a borehole, said borehole lined with a substantially impervious liner having sufficient strength to prevent collapse of said borehole, and said naturally occurring earth formation selected such that its permeability and porosity allow elemental sulfur to be retained within said subterranean cavity;
   (b) injecting said elemental sulfur through said lined borehole until the sulfur is deposited within said subterranean cavity; and
   (c) retaining said elemental sulfur in place within said subterranean cavity.

2. The method of claim 1, wherein said subterranean cavity is a mechanically-mined subterranean cavity.

3. The method of claim 1, wherein said subterranean cavity is a solution-mined subterranean cavity.

4. The method of claim 1, wherein the bottom of said subterranean cavity is located at less than about 3,000 feet below the surface of the earth.

5. The method of claim 1, wherein said sulfur is injected through said borehole in molten state.

6. The method of claim 5, wherein said sulfur injected into said borehole in molten state is injected through a set of concentric pipes, disposed within said borehole, through which a heating fluid is also circulated at a rate sufficient to prevent said sulfur from freezing within said borehole.

7. The method of claim 1, wherein said sulfur is injected through said borehole in solid state.

8. The method of claim 7, wherein said sulfur injected into said borehole in solid state is injected as an aqueous slurry of ground sulfur.

9. The method of claim 7, wherein said sulfur injected into said borehole in solid state is injected as an aqueous slurry of prilled sulfur.

10. The method of claim 1, wherein said subterranean cavity is a brine-containing, solution-mined, salt-enclosed cavity, and said sulfur injected through said borehole displaces at least a portion of said contained brine from said subterranean cavity.

11. The method of claim 1, further comprising providing means for withdrawing said retained sulfur within said subterranean cavity to the surface of the earth.

12. The method of claim 11, wherein said means for withdrawing said retained sulfur within said subterranean cavity to the surface of the earth comprise at least one set of concentric pipes for injecting hot water under pressure through a first annulus formed by said set of concentric pipes and pressurized air through a second annulus also formed by said set of concentric pipes so as to cause said retained sulfur within said subterranean cavity to rise to the surface of the earth through a centric pipe within said set of concentric pipes.

13. The method of claim 1, wherein said substantially impervious liner is made of a material selected from the group consisting of steel, nickel alloy, titanium and fiberglass reinforced plastic.

14. A method for storing sulfur, comprising:
   (a) crushing solid sulfur to obtain a crushed sulfur material;
   (b) forming a sulfur slurry by mixing said crushed sulfur material with an aqueous fluid;
   (c) injecting said sulfur slurry into a salt-enclosed subterranean cavity through a borehole penetrating said salt-enclosed subterranean cavity, said borehole lined with a substantially impervious liner having sufficient strength to prevent collapse of said borehole; and
   (d) maintaining in place said crushed sulfur material within said salt-enclosed subterranean cavity.

15. A method for storing sulfur, comprising:
   (a) contacting molten sulfur with a fluid to obtain sulfur prills by means of granulation;
   (b) forming a slurry of sulfur prills by mixing said obtained sulfur prills with an aqueous fluid;
   (c) injecting said slurry of sulfur prills into a salt-enclosed subterranean cavity through a borehole penetrating said salt-enclosed subterranean cavity, said borehole lined with a substantially impervious liner having sufficient strength to prevent collapse of said borehole; and
   (d) retaining in place said sulfur prills within said salt-enclosed subterranean cavity.

16. A method for storing sulfur, comprising:
   (a) contacting molten sulfur with a fluid to obtain sulfur prills by means of granulation;
   (b) forming a slurry of sulfur prills by mixing said obtained sulfur prills with an aqueous fluid;
   (c) injecting said slurry of sulfur prills into a salt-enclosed subterranean cavity through a borehole penetrating said salt-enclosed subterranean cavity, said borehole lined with a substantially impervious liner having sufficient strength to prevent collapse of said borehole;
   (d) retaining in place said sulfur prills within said salt-enclosed subterranean cavity; and
   (e) providing means for withdrawing said retained sulfur prills within said salt-enclosed subterranean cavity to the surface of the earth.

17. A method for storing sulfur, comprising:
   (a) penetrating a salt-enclosed subterranean cavity with a borehole lined with a substantially impervious liner, said substantially impervious liner having sufficient strength to prevent collapse of said borehole;
   (b) injecting molten sulfur into said salt-enclosed subterranean cavity through a set of concentric pipes, disposed within said borehole, through which a heating fluid is also circulated at a rate sufficient to prevent said molten sulfur from freezing within said borehole;
   (c) retaining in place said injected sulfur within said salt-enclosed subterranean cavity; and
   (d) providing means for withdrawing said retained sulfur within said salt-enclosed subterranean cavity to the surface of the earth.

18. The method of claim 17, wherein said salt-enclosed subterranean cavity is a brine-containing, solution-mined cavity, and said sulfur injected through said set of concentric pipes, disposed within said borehole, displaces at least a portion of said contained brine from said salt-enclosed subterranean cavity.

19. The method of claim 18, wherein said means for withdrawing said retained sulfur within said salt-enclosed subterranean cavity to the surface of the earth comprise at least one set of concentric pipes for injecting hot water under pressure through a first annulus formed by said set of concentric pipes and pressurized air through a second annulus also formed by said set of concentric pipes so as to cause said retained sulfur within said subterranean cavity to rise to the surface of the earth through a centric pipe within said set of concentric pipes.

20. A method for storing sulfur, comprising:
  (a) grinding solid sulfur in the presence of an aqueous fluid to form a slurry of ground sulfur particles with said aqueous fluid;
  (b) injecting said slurry of ground sulfur particles into a salt-enclosed, brine-containing subterranean cavity through a borehole penetrating said salt-enclosed subterranean cavity, said borehole lined with a substantially impervious liner having sufficient strength to prevent collapse of said borehole, so as to cause the displacement of at least a portion of said contained brine by said ground sulfur particles; and
  (c) maintaining in place said ground sulfur particles within said salt-enclosed subterranean cavity.

21. A method for storing sulfur, comprising:
  (a) contacting molten sulfur with a fluid to obtain sulfur prills by means of granulation;
  (b) injecting said sulfur prills into a salt-enclosed subterranean cavity through a borehole penetrating said salt-enclosed subterranean cavity, said borehole lined with a substantially impervious liner having sufficient strength to prevent collapse of said borehole; and
  (c) retaining in place said sulfur prills within said salt-enclosed subterranean cavity.

* * * * *